United States Patent
Van Loo et al.

(10) Patent No.: US 11,520,048 B2
(45) Date of Patent: Dec. 6, 2022

(54) LASER SCANNER FOR MONITORING A MONITORING REGION

(71) Applicant: BEA SA, Bad Berleburg (BE)

(72) Inventors: Sébastien Van Loo, Vaux-et-Borset (BE); Marc Meyers, Seraing (BE); Theodoros Campas, Boncelles (BE); Jean-Francois Klein, Eupen (BE)

(73) Assignee: BEA S.A., Angleur (BE)

( * ) Notice: Subject to any disclaimer, the term of this patent is extended or adjusted under 35 U.S.C. 154(b) by 392 days.

(21) Appl. No.: 16/623,365

(22) PCT Filed: Jun. 15, 2018

(86) PCT No.: PCT/EP2018/065988
§ 371 (c)(1),
(2) Date: Dec. 16, 2019

(87) PCT Pub. No.: WO2018/229264
PCT Pub. Date: Dec. 20, 2018

(65) Prior Publication Data
US 2020/0183005 A1    Jun. 11, 2020

(30) Foreign Application Priority Data
Jun. 16, 2017    (DE) .......................... 102017113237.6

(51) Int. Cl.
*G01S 17/10*    (2020.01)
*E05F 15/73*    (2015.01)
(Continued)

(52) U.S. Cl.
CPC .............. *G01S 17/10* (2013.01); *E05F 15/73* (2015.01); *G01S 17/42* (2013.01); *G01S 17/88* (2013.01);
(Continued)

(58) Field of Classification Search
CPC ............... E05F 15/73; E05Y 2900/132; E05Y 2900/148; G01S 17/10; G01S 17/88;
(Continued)

(56) References Cited

U.S. PATENT DOCUMENTS 7,349,074 B2 *    3/2008    Zambon ................. G01S 7/481
356/5.01
10,007,001 B1 *    6/2018    LaChapelle ........... G01S 7/4802
(Continued)

FOREIGN PATENT DOCUMENTS

DE             19831534 A1    9/1999
DE       102006043615 A1     3/2008
(Continued)

OTHER PUBLICATIONS

English Translation of DE102006043615A1 Publication date: Mar. 27, 2008.*
(Continued)

*Primary Examiner* — Justin B Rephann
(74) *Attorney, Agent, or Firm* — Womble Bond Dickinson (US) LLP; Joseph Bach, Esq.

(57) ABSTRACT

Laser scanner monitors region in front of an opening. Monitoring region is delimited by a frame, in front of which an edge region is located. Propagation time sensing means determines position of an object in the monitoring region by a propagation time measurement of laser pulse, an evaluation unit being provided, by means of which first object information is produced, whether an object was sensed by the propagation time measurement. An intensity sensing means evaluating received laser pulse with respect to the intensity thereof and the sensed intensity is compared with a reference intensity stored in a memory unit. Second object information being provided in the event of deviation beyond a certain threshold value, whether an object is located in the (Continued)

hazard edge region on the basis of the intensity deviation. A "safety signal" generated by the evaluation unit if first or second object information is positive.

20 Claims, 3 Drawing Sheets

(51) Int. Cl.
  *G01S 17/88* (2006.01)
  *G01S 17/42* (2006.01)
  *G01S 7/487* (2006.01)
(52) U.S. Cl.
  CPC ... *E05Y 2900/132* (2013.01); *E05Y 2900/148* (2013.01); *G01S 7/487* (2013.01)
(58) Field of Classification Search
  CPC .......... G01S 7/487; G01S 17/42; G01S 17/89; G01S 17/931; G01S 7/4817
  See application file for complete search history.

(56) References Cited

U.S. PATENT DOCUMENTS

| | | | |
|---|---|---|---|
| 10,732,281 B2* | 8/2020 | LaChapelle | G01S 7/497 |
| 2002/0179822 A1 | 12/2002 | Breed et al. | |
| 2006/0169876 A1* | 8/2006 | Zambon | E05F 15/74 |
| | | | 250/221 |
| 2009/0262760 A1* | 10/2009 | Krupkin | G01S 7/484 |
| | | | 356/28 |
| 2013/0107000 A1* | 5/2013 | Xue | G01S 7/4861 |
| | | | 348/46 |
| 2015/0144790 A1 | 5/2015 | Velichko et al. | |

FOREIGN PATENT DOCUMENTS

| | | |
|---|---|---|
| DE | 602004012086 T2 | 2/2009 |
| DE | 102014102420 A1 | 8/2015 |
| EP | 3070494 A1 | 9/2016 |
| JP | 2006038854 A | 2/2006 |
| JP | 2014055925 A | 3/2014 |
| JP | 2014178186 A | 9/2014 |
| JP | 2015219120 A | 12/2015 |
| JP | 2021173073 A | 11/2021 |

OTHER PUBLICATIONS

Search Report for German Patent Application No. 102017113237.6.
International Search Report and Written Opinion for PCT/EP2018/065988.
Notification of Reasons for Refusal from related Japanese Patent Application No. 2019-569751 dated Feb. 7, 2022 (11 pages including translation).

\* cited by examiner

LASER SCANNER FOR MONITORING A MONITORING REGION

This application is the national phase of International Application No. PCT/EP2018/065988, filed on Jun. 15, 2018, which claims priority to and the benefit of German Patent Application No. 102017113237.6, filed on Jun. 16, 2017, the disclosures of which are hereby incorporated by reference in their entireties.

The invention relates to a laser scanner for monitoring a monitoring region in front of an opening that can be closed by a closing means, as well as to an arrangement comprising at least a laser scanner and a frame member that delimits the monitoring region.

Laser scanners for automatic doors and windows are known in the prior art. In the prior art manner, these laser scanners include propagation time sensing means for determining a distance from the laser scanner and for making an assignment to a monitoring region. In this process, individual laser pulses, each assigned to an angle and emitted by the laser scanner, are reflected by an object. The reflection is evaluated by means of propagation time measurement. This allows the position of an object to be detected in the monitoring region. If such position is in a region defined as a hazard region, a so-called "safety" signal will routinely be sent to a control unit in order to prevent an object from being trapped in the automatic closing means, in particular a door or a window. A positive "safety" signal will routinely cause the control unit of the closing means to stop or to reverse the closing movement.

It is disclosed in DE 10 2006 043 615 DE that a laser scanner having a transmitting unit and a receiving unit can be used to detect an object in a monitoring region. The received signal is compared with a reference signal, which reference signal may be correlated with a door movement. A comparison is made both for the propagation time measurement and for the reflectivity measurement.

It is the object of the invention to achieve an as reliable as possible detection of a vulnerable object in the hazard region "safety" region. High reliability shall also be ensured when the hazard region is located in the vicinity of a frame that delimits the monitoring region. This is to apply to small objects in particular.

This object is accomplished by the characterizing features of claim 1.

Disclosed in the dependent claims are advantageous further embodiments of the invention.

According to the invention, a laser scanner for monitoring a monitoring region in front of an opening that can be closed by a closing means is designed as described below. Using an evaluation unit, the laser scanner determines the position of an object in the monitoring region by measuring the propagation time of a transmitted and received laser pulse. The monitoring region comprises at least one hazard region, and when an object is detected in said hazard region, the laser scanner will output a "safety" signal. If no object is detected in the hazard region outside the hazard edge region, first object information will be generated based on the propagation time measurement, namely whether an object was sensed in the hazard edge region by means of the propagation time measurement. Furthermore, the intensity of the received laser pulse will be evaluated and the sensed intensity will be compared with a reference intensity stored in a memory unit of the laser scanner. In the event of deviation beyond a certain threshold value, second object information will be provided, namely whether, based on the intensity deviation, an object is located in the hazard edge region. The hazard edge region is the region in the vicinity of which the monitoring region is physically delimited by a frame and which is moreover defined as a hazard region.

A distance from an edge region which is obtained in the vicinity of the frame that delimits the monitoring region at least on one side, in particular on two sides, is to be determined. The problem about the edge region is that the accuracy of the propagation time measurement in the edge region is only possible inaccurately. This makes it difficult to detect small objects in this region. The region in which no reliable distinction can be made between a small object and the background formed by the frame is called the gray area. The accuracy of the propagation time measurement which is captured by means of the reflected light pulse, also depends on the difference in the degree of reflectivity of the object with respect to the background.

On the basis of the received intensity, an error correction of the propagation time measurement can also be performed to allow a more accurate evaluation of the position.

A major difference in reflectivity will result in a high deviation that will affect the size of the gray area in the edge region of the frame.

The invention proposes that an intensity comparison be performed between the background and the current object measurement. If the deviation of the measured intensity exceeds a predefined threshold value, a detection will be reported, even if a propagation time measurement does not produce a detection result within the frame.

The intensity deviation is the amount of the difference between the reference intensity and the object intensity.

In this way, the inaccuracy of the propagation time measurement in the gray area in the region of an edge can be eliminated. This ensures high detection reliability even for small objects.

In a scanning operation, the laser scanner uses laser pulses distributed in a sector to scan a plane which, in its projection, covers the opening to be monitored, and which, in particular, is parallel to the opening plane.

The intensity is measured by evaluating the received pulse width. The detector used is an avalanche photodiode.

Preferably, the intensity is averaged over several successive laser pulses for a point, and a mean value is formed which is compared with a reference mean value.

The reference intensity is recorded during initial operation and in cycles, if necessary, and stored in the memory unit. The reference intensity can be corrected by the laser pulses detected during the measurement. In particular, a correction is made during each measurement in which no detection is made for the measured laser pulse. This allows continuous adaptation to changes in the environment.

If first object information is provided that represents an object in the monitoring region, a "safety" signal will be output at the laser scanner output.

If second object information is provided simultaneously that represents an object in the monitoring region, a comparison with the approximately simultaneous object information will be carried out.

The sensor comprises an electronic evaluation unit for evaluating propagation time and intensity. The evaluation unit furthermore includes a filter, with the filter properties affecting the size of the gray area.

It is also possible for the monitoring region to include, in addition to the hazard edge region, other detection regions which may, for example, trigger activation. For these regions, provision can be made to only take an object in such a region into account for the propagation measurement. This results in a more robust detection behavior of the laser scanner. For the hazard region, the intensity measurement will therefore not be taken into account unless it is an edge region.

As a rule, the size of the defined edge region is approx. 2 cm to 5 cm. This size depends, among other things, on the filters used to evaluate the propagation time information. According to another aspect of the invention, the invention relates to an arrangement comprising an at least partially circumferential frame, a closing means for closing the opening formed by the frame, and a laser scanner as previously described, said laser scanner being mounted on the frame in such a manner that the frame will at least partially delimit the monitoring region of the laser scanner.

The laser scanner is preferably mounted in a corner of the frame.

Furthermore, the arrangement may comprise a control unit for controlling the closing means, in particular a window, which cooperates with the laser scanner.

Additional advantages, features and possible applications of the present invention may be gathered from the following description in which reference is made to the embodiments illustrated in the drawings.

Throughout the description, claims and drawings, those terms and associated reference signs are used as are specified in the list of reference signs below. In the drawings:

Figure 1:
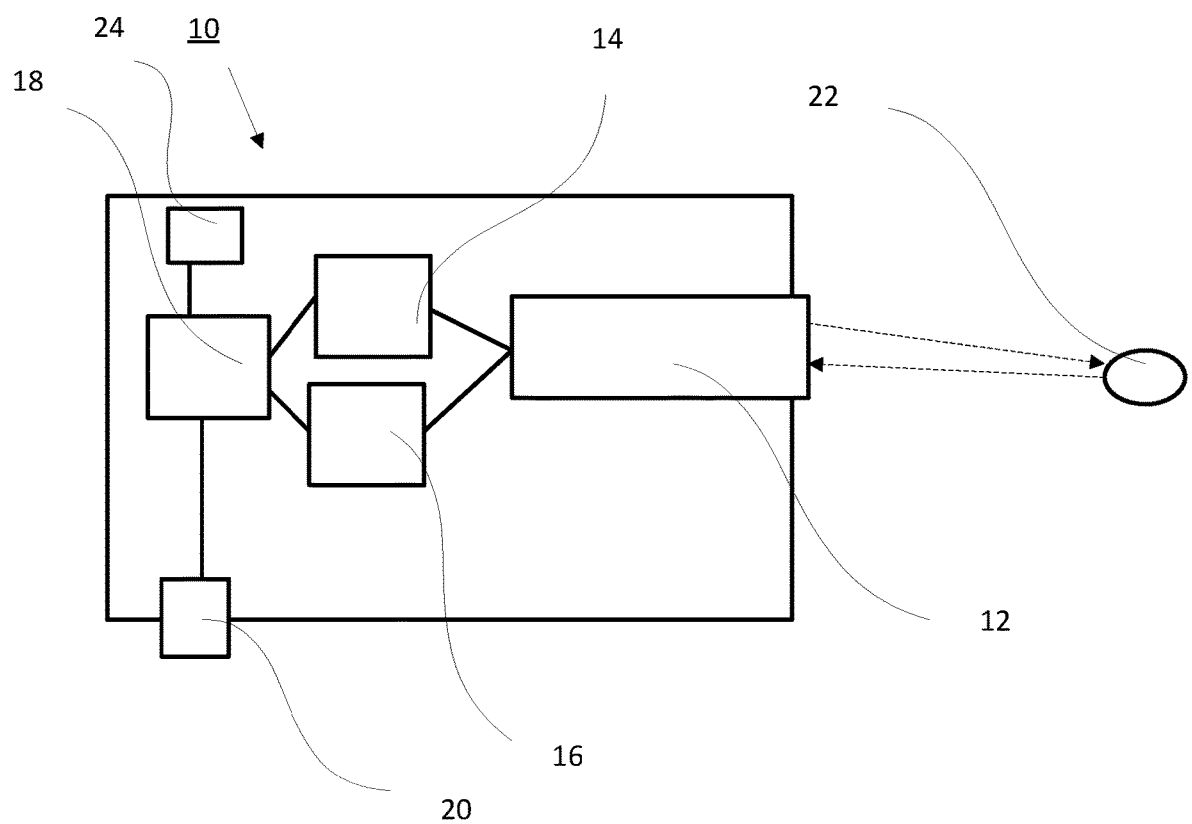
FIG. 1 is a laser scanner according to the invention.

FIG. 1 shows a laser scanner 10 according to the invention having a laser scanner transmitting and receiving unit 12 capable of transmitting laser pulses over an angular range and of receiving the laser pulses reflected by an object 22. The received laser pulses are then analyzed in a propagation time sensing means 14 and an intensity sensing means 16. Furthermore, an evaluation unit 18 is provided which makes a decision—based on the values generated by the propagation time sensing means 14 and the intensity sensing means 16—as to whether a positive "safety" signal is to be output at the "safety" output 20, whereby a control unit can be set to a safety mode. For evaluation, the evaluation unit 18 uses reference values that are stored in a memory unit 24. The exact function of the evaluation unit will be described in more detail with reference to FIG. 4.

Figure 2:
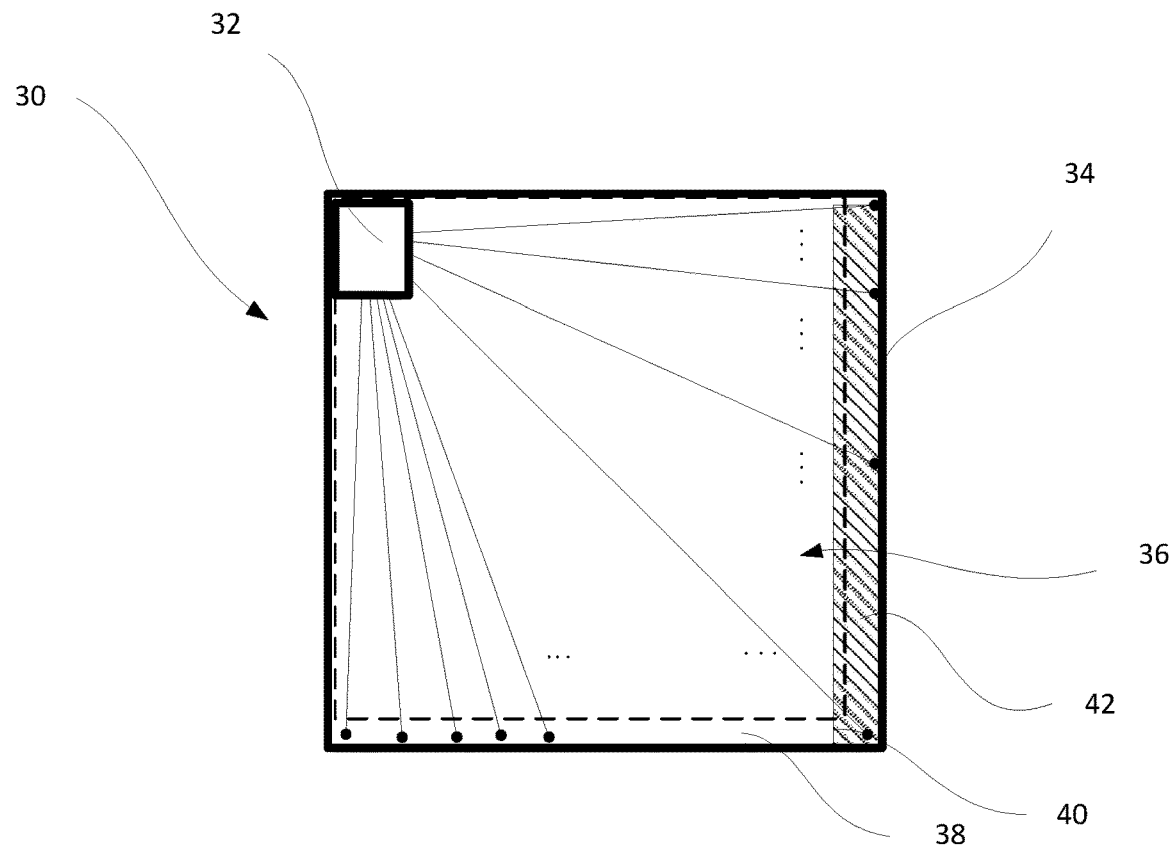
FIG. 2 is schematic view of an arrangement according to the invention where there is no object in the detection region.

FIG. 2 shows an arrangement 30 according to the invention, comprising a frame 34 and a laser scanner designed as a laser scanner 32. The laser scanner 32 emits laser pulses that can be reflected by an object in a monitoring region 36 or a frame 34 delimiting the monitoring region.

The propagation time from the emission of the laser pulse to the detection of the reflection is determined. The propagation time can be used to detect the position of an object within the frame 34 in the monitoring region 36. Owing to the accuracy of the propagation time measurement for small objects, this type of detection reaches its limits in the edge region 38 of the monitoring region 36 near the frame 34.

The edge region 38, delimited by the dashed line in the drawing, extends from the lower edge over the right edge of the frame 34 and is also considered a hazard region 40 at the right edge. In this region, the edge region 38 represents a hazard edge region 42 which is to be evaluated in a reliable manner.

According to the invention, in addition to the propagation time, also the intensity of the reflected laser pulse is evaluated in the hazard edge region 42. The evaluation is carried out as described in more detail with reference to FIG. 4, by determining the reference values of frame 34 for each laser pulse in an initialization cycle. The sensed intensity is compared to the reference intensity stored in the laser scanner 32. If the deviation exceeds a predefined threshold value, a "safety" signal will be sent to the control unit to control the closing means (not shown here for reasons of clarity), in particular the window, with the result that a potential closing process will be interrupted.

Figure 3:
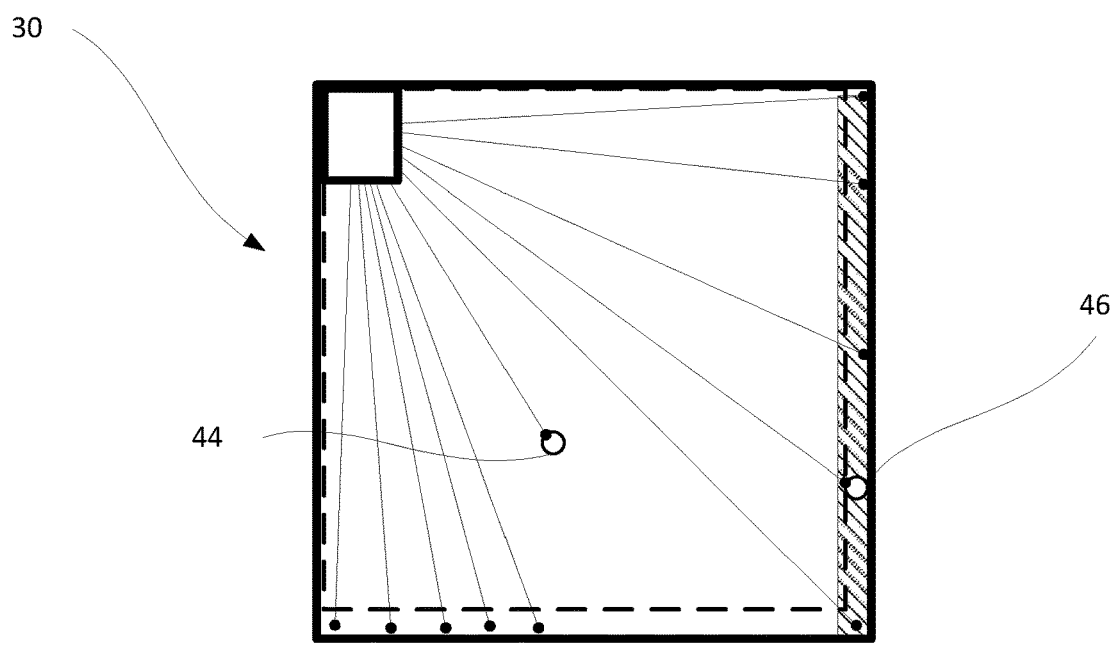
FIG. 3 is a schematic view of an arrangement according to invention where there is an object in the detection region and in the edge region.

FIG. 3 shows the arrangement 30 of FIG. 2, with two objects 44, 46 being illustrated in this case, of which object 44 is detected by means of the propagation time measurement and object 46 can be detected in an evaluation of the hazard edge region taking into account the intensity measurement, although the propagation time measurement in the gray zone does not permit an unambiguous evaluation. To measure the intensity of the laser pulse, the pulse width of the received laser pulse is evaluated.

Figure 4:
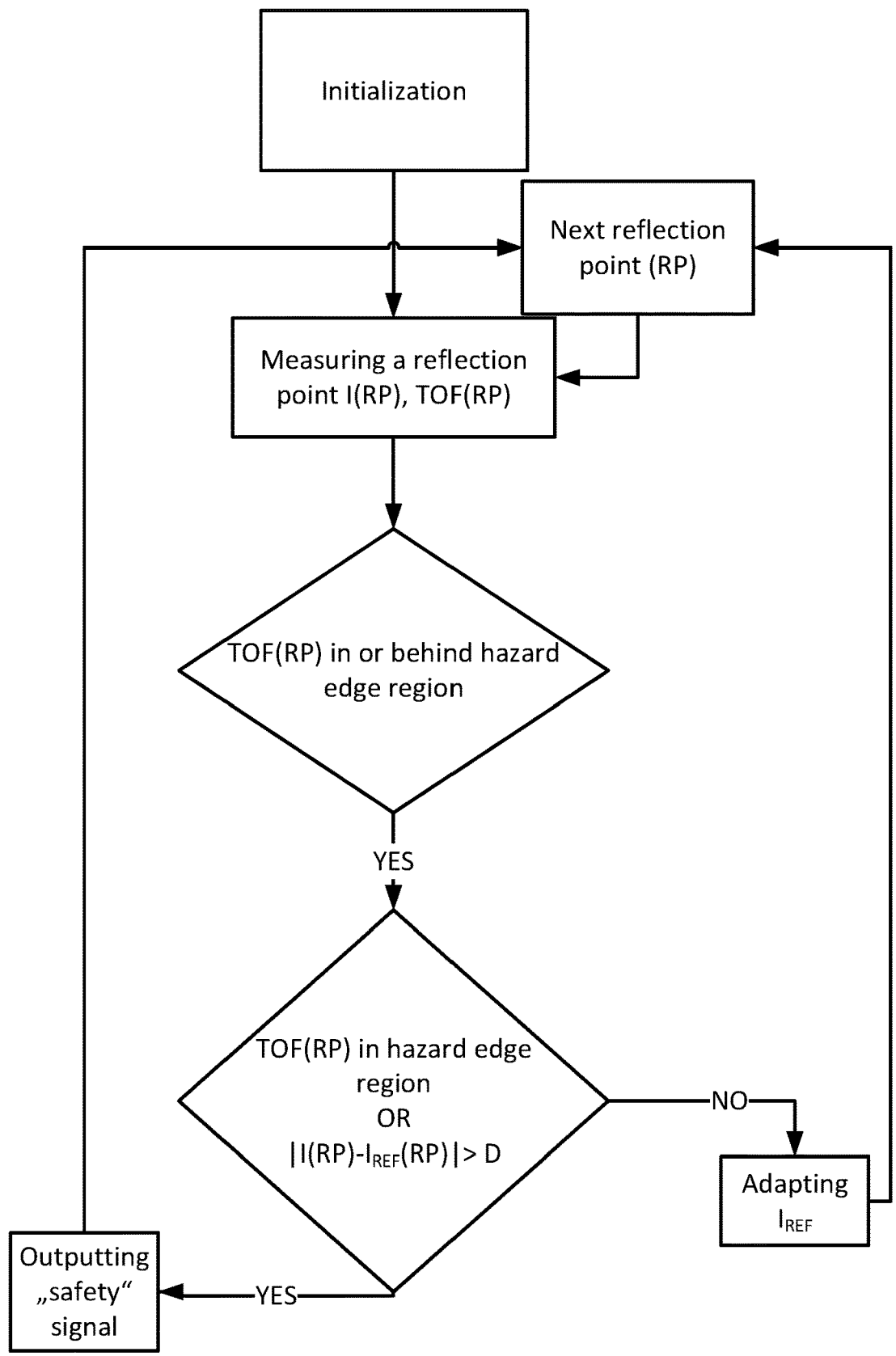
FIG. 4 is a schematic flow chart.

FIG. 4 shows a flow chart for detecting sensing an object that is detected in a hazard edge region. A propagation time measurement is performed, which is also referred to as time of flight (TOF) measurement. Using the propagation time of the laser pulse, the distance of a point off which the laser pulse is reflected is assigned to a position in the monitoring region, or is discarded if it is outside the monitoring region.

Depending on the design of the closing means, there is a hazard region which is assigned to the monitoring region. Thus a hazard region is defined in the monitoring region, if an object is detected in the hazard region, a so-called "safety" signal will be output by the evaluation unit.

If the monitoring region is delimited by a physical frame in the hazard region, this will result in a hazard edge region. In this edge region, an evaluation of the propagation time measurement cannot always be carried out with sufficient accuracy to allow the detection of a small object.

During initial operation of the laser scanner, in an initialization run thereof, the position of the edge region is detected by means of a TOF measurement and its reflectivity is measured by means of the reflected laser pulse, which is stored as a reference value for the corresponding measuring point in a memory of the laser scanner.

Therefore, when the TOF measurement is evaluated, it is decided whether the value of the TOF distance measurement is greater than the distance from the defined hazard edge region.

If this is the case, a hazard edge region evaluation is carried out. During such hazard edge region evaluation, besides first object information obtained from the TOF measurement, second object information is produced. The second object information shows whether a deviation of the reflectivity of the currently measured laser pulse is greater than the measured value of an assigned reference reflectivity, which reflects the reflectivity of the frame. The reflectivity is evaluated as a function of the intensity of the received laser pulse, and is determined from the pulse width. If the amount of the difference between intensity and reference intensity is above the threshold value D, the second object information provided will be positive, otherwise negative.

If the value of the TOF measurement of the reflected point lies in the hazard edge region, the first object information provided will also be positive, otherwise negative.

The evaluation unit will output a positive "safety" signal if the first object information or the second object information is positive.

In this way, in the edge region, where particularly large inaccuracies occur in the TOF measurement when there is a large difference between the reflectivity of the object and the frame behind ft can be largely eliminated by using the intensity information for this purpose.

Consequently, even small objects will be detected in the hazard region.

If the deviation of the intensity is less than the threshold value D, the stored reference reflectivity is corrected with this value.

LIST OF REFERENCE SIGNS 10 laser scanner
12 laser scanner transmitting/receiving unit
14 propagation time sensing means
16 intensity sensing means
18 evaluation unit
20 "safety" output
22 object
24 memory
30 arrangement
32 laser scanner
34 frame
36 monitoring region
38 edge region
40 hazard region
42 hazard edge region
44 first object
46 second object
D threshold

The invention claimed is:

1. A laser scanner for monitoring a monitoring region in front of an opening that can be closed by a closing means, the closing means defining a hazard region within the monitoring region, the monitoring region being delimited at least on one side by a frame, the scanner comprising: a laser transmitting/receiving unit emitting laser pulses scanning the monitoring region, a propagation time sensing unit which determines a distance to an object in the monitoring region by means of a time of flight measurement (TOF) of the laser pulses, the propagation time sensing including a filter which defines a hazard edge region within the hazard region, an evaluation unit which generates a first object signal when it determines that the TOF indicates that the laser pulses are reflected from within the hazard region, an intensity sensing means operable when the TOF indicates that the laser pulses are reflected from within the hazard edge region to perform intensity sensing of the laser pulses and to compare the intensity of the received laser pulses to a reference intensity stored in a memory unit and issue a second object signal in the event of deviation beyond a certain threshold value, wherein the evaluation unit issues a safety signal if either the first or the second object signal is positive.

2. Laser scanner according to claim 1, characterized in that the laser transmitting/receiving unit comprises an avalanche photodiode.

3. Laser scanner according to claim 2, characterized in that the intensity sensing is performed by means of pulse width evaluation.

4. Laser scanner according to claim 2, characterized in that an initialization device is provided which enables an initialization of the laser scanner, with the reference intensity of a frame in the monitoring region being stored in the memory unit during initialization.

5. Arrangement comprising an at least partially circumferential frame, a closing means for closing the opening formed by the frame, and the laser scanner according to claim 2, the laser scanner being mounted on the frame in such a way that the frame at least partially delimits the monitoring region of the laser scanner.

6. Laser scanner according to claim 1, characterized in that the intensity sensing is performed by means of pulse width evaluation.

7. Laser scanner according to claim 6, characterized in that an initialization device is provided which enables an initialization of the laser scanner, with the reference intensity of a frame in the monitoring region being stored in the memory unit during initialization.

8. Arrangement comprising an at least partially circumferential frame, a closing means for closing the opening formed by the frame, and the laser scanner according to claim 6, the laser scanner being mounted on the frame in such a way that the frame at least partially delimits the monitoring region of the laser scanner.

9. Laser scanner according to claim 1, characterized in that an initialization device is provided which enables an initialization of the laser scanner, with the reference intensity of a frame in the monitoring region being stored in the memory unit during initialization.

10. Laser scanner according to claim 9, characterized in that the monitoring region and the hazard region are defined during initialization.

11. An arrangement comprising an at least partially circumferential frame, a closing means for closing the opening formed by the frame, and the laser scanner according to claim 1, the laser scanner being mounted on the frame in such a way that the frame at least partially delimits the monitoring region of the laser scanner.

12. Arrangement according to claim 11, characterized in that the sensor is mounted in a corner portion of the frame.

13. Arrangement according to claim 12, characterized in that the frame is part of a window or a window reveal.

14. Arrangement according to one of claim 12, characterized in that the closing means is controlled by a control unit that is connected to the laser scanner.

15. Arrangement according to one of claim 12, characterized in that the closing means is a window.

16. Arrangement according to claim 11, characterized in that the frame is part of a window or a window reveal.

17. Arrangement according to one of claim 16, characterized in that the closing means is a window.

18. Arrangement according to claim 11, characterized in that the closing means is controlled by a control unit that is connected to the laser scanner.

19. Arrangement according to one of claim 18, characterized in that the closing means is a window.

20. Arrangement according to claim 11, characterized in that the closing means is a window.

* * * * *